US006536581B1

(12) United States Patent
Tull, III et al.

(10) Patent No.: US 6,536,581 B1
(45) Date of Patent: Mar. 25, 2003

(54) FLANGE TURNER WITH DAMPENING DEVICE

(75) Inventors: Herbert G. Tull, III, Ruston, LA (US); Colin Godfrey, Ruston, LA (US)

(73) Assignee: Hunt, Guilliot & Associates, L.L.C., Ruston, LA (US)

( * ) Notice: Subject to any disclaimer, the term of this patent is extended or adjusted under 35 U.S.C. 154(b) by 22 days.

(21) Appl. No.: 09/747,807

(22) Filed: Dec. 22, 2000

(51) Int. Cl.[7] ............................................... B65G 47/24
(52) U.S. Cl. ........................................ 198/407; 198/416
(58) Field of Search ................................ 198/406, 407, 198/409, 416; 193/45

(56) References Cited

U.S. PATENT DOCUMENTS

| 1,435,263 A | * 11/1922 | Soubier ...................... 198/409 |
| 1,632,204 A | 6/1927 | Threefoot |
| 1,657,680 A | 1/1928 | Lorenz |
| 2,681,724 A | 6/1954 | Coffman |
| 2,704,592 A | 3/1955 | Hoppe |
| 2,944,655 A | 7/1960 | Griswold |
| 4,179,236 A | 12/1979 | Jones |
| 4,228,901 A | 10/1980 | Watzka |

* cited by examiner

Primary Examiner—Kenneth W. Noland
(74) Attorney, Agent, or Firm—Kean, Miller, Hawthorne, D'Armond, McCowan & Jarma

(57) ABSTRACT

An apparatus for rotating elongated members of rectangular cross section, such as board lumber, is disclosed. The apparatus includes a pair of conveyors arranged so that the boards will cascade from the end of one conveyor onto the other conveyor by force of gravity, rotating in the process. A dampening mechanism to reduce the impact caused by the fall is also disclosed. The dampening mechanism allows the members to be delicately balanced on any side. After an inspection, the boards are turned again to position them for final processing. This second rotation is performed by halting the leading edge of the boards, at either the top or bottom, and propelling the opposite edge forward with a rubber wheel.

19 Claims, 7 Drawing Sheets

FLANGE TURNER WITH DAMPENING DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates, generally, to a device for handling lumber.

2. Description of Related Art

In the manufacture of wooden I-beams, the rectangular wood flanges may be cut by rip saw from laminated billets. It is desirable to inspect the laminations at each cut prior to final assembly in order to assure the quality of the products to be made from the flanges. From the cutting process to positioning for final assembly, the flanges must be turned twice to facilitate the inspection process. By turning the flanges, each fresh cut is made visible. Because the flanges can be longer than 80 feet, turning the flanges manually is difficult and undesirable.

The simplest way of performing the first turn automatically is to use gravity in combination with a pair of conveyors. A conveyor apparatus is generally required as part of the manufacture and inspection process regardless of the technique used to turn the flanges. By adding a second conveyor and positioning it below the end of the first, a cascade is created. When the flanges reach the end of the first conveyor, they will follow the rounded end of the conveyor pulley and fall to the second conveyor having rotated approximately ninety degrees. Of course, the conveyance speed and the height difference of the conveyors must be set to suitable levels to achieve proper rotation. This simple cascade method works well when the flanges have an approximately square cross-section.

The previously described method is not sufficient when the aspect ratio of the flanges is significantly high. If the width-to-thickness ratio of the flanges is too great, the relatively narrow base upon which to flange must balance, coupled with the bounce of the flange upon impact, causes many of the flanges to fall onto their wide side. Generally the flanges fall forward due to their angular and linear momentum.

The second turn, which places the flanges into their final position for assembly, is another practical difficulty involved in the preparation and inspection process. Some of the flanges need to be returned to their original orientation while others need to be turned an additional ninety degrees.

Several mechanisms exist for reorienting objects of varying shape during a manufacturing process. However, there is no known device for simply and reliably rotating elongated members of varying aspect ratio about their longitudinal axis.

What is needed is a simple and inexpensive system for performing the turns. The first element of such a system is a device for turning flanges onto their narrow side which is more reliable than a simple cascade system. The second element returns the flanges to their original orientation or alternatively turns the flanges an additional ninety degrees.

SUMMARY OF THE INVENTION

It is an object of the present invention to provide a mechanism by which elongated members can be automatically rotated during a linear translation.

It is another object of the present invention to provide a mechanism capable of reliably performing the rotation on members of diverse cross-sectional aspect ratios.

It is another object of the present invention to provide a flange turning device which is relatively inexpensive.

These and other objects are achieved, according to the invention, by a device for rotating elongated objects of approximately rectangular cross-section about the longitudinal axis. The device includes a first turn section and a second turn section.

The first turn comprises two conveyor units arranged to allow a cascade effect as the members fall from the end of the first conveyor to the second conveyor. The members, positioned with their length generally perpendicular to the direction of conveyance, naturally rotate about their longitudinal axes as they fall. A dampening mechanism dissipates a portion of the energy of the members gained during the fall and places the members onto the second conveyor.

In one embodiment the dampening mechanism includes at least one rotating portion which catches the member in mid-fall and, through rotation, places the member on the second conveyor. The rotating portion of the mechanism is dampened to allow for smooth placement of the member onto the second conveyor. A spring returns the rotating portion back to its starting position after the flange member has been carried away.

The addition of a second rotating member to the dampening mechanism provides even further benefit. With a single rotating member, the member pushes up against the flange even after the flange has been placed on the second conveyor. This action is due to the spring return mechanism and can cause a significant force against the rear corner of the flange as the flange passes off of the rotating member. It can even cause the flange to fall forward onto its wide side. Disclosed herein is the use of a second rotating member which pushes the flange forward off of the first rotating member so that the first rotating member exerts no force on the flange once it has reached the second conveyor.

Also disclosed herein is a mechanism which accomplishes the desired task without the use of rotating members. In this embodiment, the dampening mechanism includes a horizontally positioned member translatable along its vertical axis and dampened by a piston-cylinder device. A second member powered by a fluidic connection with the first piston-cylinder device can be added to push the flange, imparting some forward momentum before the flange makes contact with the second conveyor.

The second turn comprises an upper and a lower section. Flanges to be turned back to their original orientation proceed to the upper section, while flanges to be turned an additional ninety degrees are directed to the lower section. The two sections operate on the same principle. The flanges are stopped on the second conveyor by stop pins to ensure the flanges enter the turner oriented perpendicular to the direction of conveyance. When the stop pins are removed the flanges approach the end of the second conveyor.

In the upper section a dog halts the top edge of each flange while an elastomeric wheel propels the bottom edge forward. The flange then drops away from the dog, falls on the wheel, and moves onto the discharge conveyor with the original surface facing up. In the lower section, a trip point halts the bottom edge of each flange while an elastomeric wheel propels the upper edge forward. The flange then falls onto the discharge conveyor with the desired orientation.

DETAILED DESCRIPTION OF THE INVENTION

Figure 1:
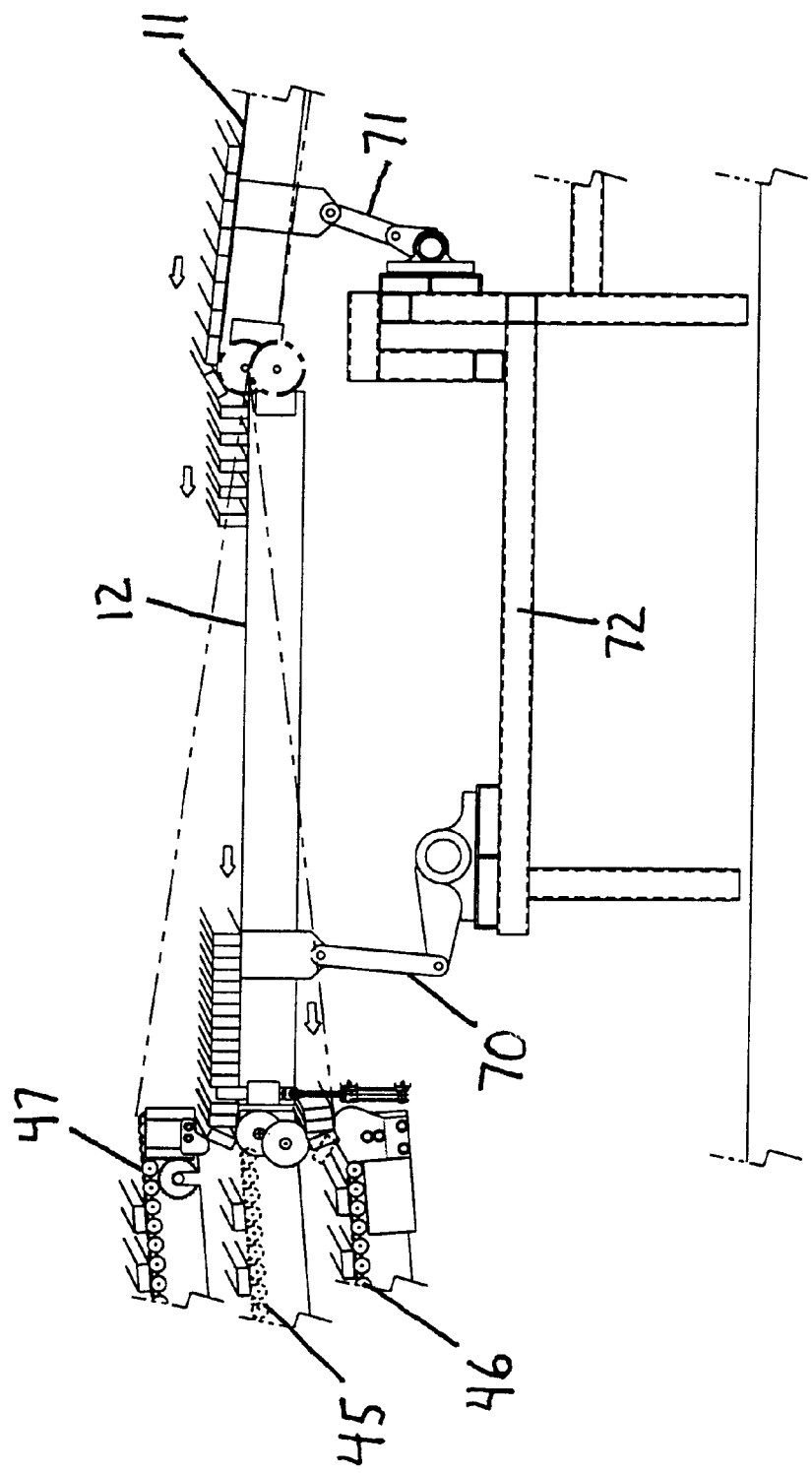
FIG. 1 is a side view of the invention.

FIG. 1 is a full view of the invention. It shows the process that the flanges go through as they are turned onto their narrow side and then turned back again to their wide side. The first turn is shown on the right, and the second turn is shown on the left. Second conveyor 12 is shown in the middle of the drawing. Both first conveyor 11 and second conveyor 12 can be pivoted about their respective right sides. First conveyor 11 is adjusted by first conveyor arm 70 to provide various vertical displacements between the conveyors to accommodate different flange sizes, as discussed below. Second conveyor 12 is adjusted by second conveyor arm 71 to control the exit path of the flanges. Reject conveyor 47 is shown on top at the left, upper discharge conveyor 45 at the middle, and lower discharge conveyor 46 at the bottom. Both conveyors are fixed to frame 72.

Figure 2:
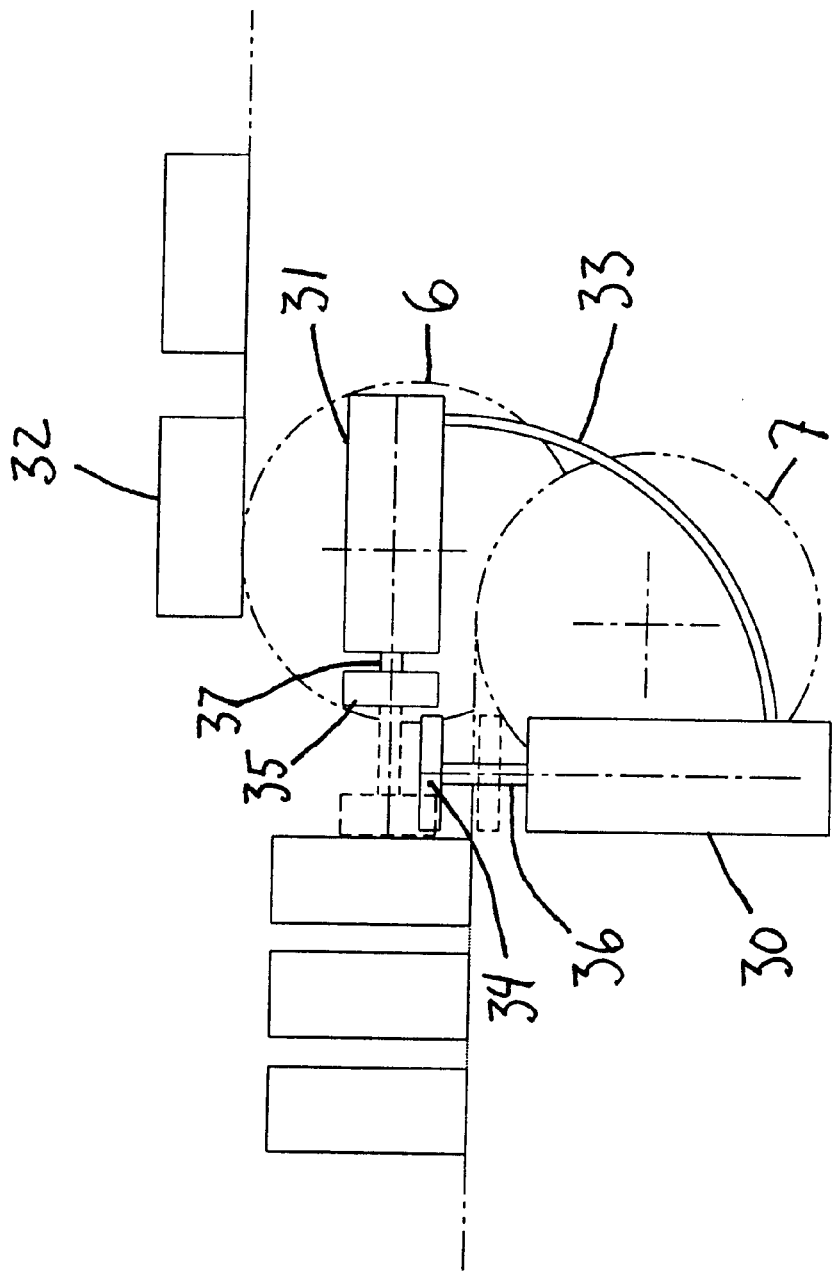
FIG. 2 is a side view of an embodiment of the first turn.
Figure 3:
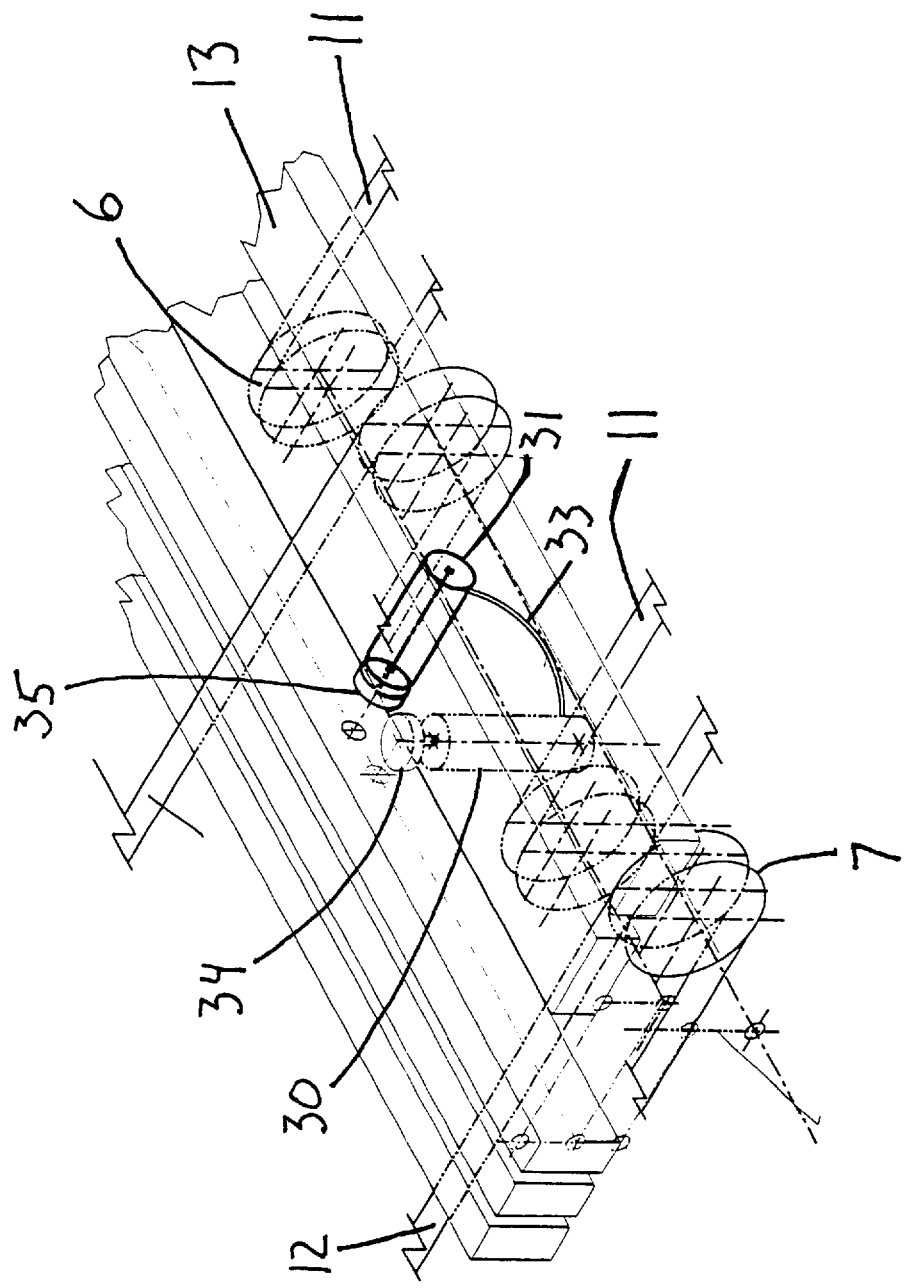
FIG. 3 is an isometric view of the embodiment shown in FIG. 2.

One embodiment of the first turn section of the invention is shown in FIG. 2 and FIG. 3. First conveyor 11, second conveyor 12, first conveyor pulley 6, and second conveyor pulley 7 are shown. Vertically positioned cylinder 30 houses a piston (not shown) and piston rod 36. Foot 34 is supported by piston rod 36 such that foot 34 is translatable along an approximately vertical axis, dampened in the downward direction by fluid action in cylinder 30. Also shown in FIG. 2 and FIG. 3 is a second, horizontally positioned cylinder 31 which houses a piston (not shown) and piston rod 37. Piston rod 37 is attached to pusher 35, translatable along an approximately horizontal axis.

Foot 34 must be able to pass below the plane of second conveyor 12 in order to deposit flange 32 onto second conveyor 12. This potential problem of interference by the conveyors applies to all embodiments ofthe invention. Several solutions are disclosed below for the embodiments of FIG. 2 and FIG. 3, and these solutions also apply in a general sense to the other embodiments.

One solution is to utilize conveyors which consist of chains circling sprocket conveyor pulleys as opposed to a continuous sheet of material stretched across the width of the conveyor. This chain type of conveyor is depicted in FIG. 2. As shown in the figure, the area between the chains remains open providing room for the dampening apparatus. Furthermore, with this chain design one can easily adjust the height difference between the conveyors. The vertical spacing can even be set to a level less than the diameter of either pulley simply by using conveyors of different widths or establishing a slight horizontal offset between the conveyors. FIG. 2 shows a horizontal offset.

Another solution to the problem of conveyor interference with the dampening apparatus is to use multiple instances of the dampening mechanism and place them outside of the conveyors. To use this solution the flanges must be greater in length than the conveyors are wide so that the flanges will contact both dampening mechanisms. In the embodiment of FIG. 2, this solution requires that foot 34 comprise two surfaces, one surface positioned on each side of second conveyor 12 capable of supporting flange 32 after flange 32 falls from the end of first conveyor 11. The two surfaces of foot 34 may be connected at a point below second conveyor 12 and from there connected to piston rod 36. Alternatively, a cylinder may be used on each side of second conveyor 12, each cylinder supporting its own foot. Numerous other geometries exist which would accomplish the task. For instance, one or more cylinders could be mounted upside-down above second conveyor 12, provided the foot support members did not interfere with flange 32.

Referring again to FIGS. 1 and 2, it is important to note that horizontal cylinder 31, air line 33, and pusher 35 are optional features of the invention. Vertical cylinder 30 is capable of providing the necessary dampening effect with the use of a restriction through which fluid is moved. For the single-cylinder embodiment, the turning process begins when flange 32 reaches end of first conveyor 11. Flange 32 follows the curvature of first conveyor pulley 6, rotating approximately ninety degrees, until flange 32 contacts foot 34, which is in its starting position. With the cylinder acting as a damper, the foot 34 travels downwardly toward second conveyor 12. As foot 34 passes below the plane of second conveyor 12, flange 32 makes contact with second conveyor 12 and flange 32 carried along with second conveyor 12, rotated with respect to its previous position on first conveyor 11. The dampening effect of cylinder 30 prevents a large impact force due to the gravitational acceleration of flange 32.

Foot 34, which is biased, then returns to its starting position ready to receive another flange 32. The bias for foot 34 can be created in numerous ways. The simplest mechanism to accomplish this is a spring housed in cylinder 30. The actual location and type of spring is of course not important to the spirit of the invention, as long as foot 34 is directly or indirectly biased to return to its starting position. A coiled or flat spring, located within the cylinder or without, would all be sufficient. Another possibility to create the bias is to move air during the downstroke into a reservoir that would become somewhat pressurized. The pressurized air in the reservoir would then expand when the weight of flange 32 was removed from foot 34, pushing piston rod 37 and foot 34 back to the starting position. Others skilled in the art will know of other means for biasing foot 34.

The performance of this embodiment can be improved with the addition of horizontally positioned cylinder 31 as shown. Cylinder 31 houses a piston (not shown) and second piston rod 37. At the end of second piston rod 37 is pusher 35. Pusher 35 comprises a surface approximately perpendicular to that of foot 34. First cylinder 30 and second cylinder 31 communicate through fluid line 33. This communication causes an extension of one piston rod during retraction of the other, and vice versa.

During the turning process, flange 32 leaves first conveyor 11 and contacts foot 34. Flange 32 exerts a downward force on foot 34 due to the weight and momentum of flange 32. This downward force causes first piston rod 36 to recede into first cylinder 30. The resultant pressure increase in first cylinder 30 is transferred along fluid line 33 to second cylinder 31. The pressure created in the second cylinder 31 causes second piston rod 37 to extend, bringing pusher 35 into contact with flange 32. As flange 32 continues to move downwardly with foot 34, pusher 35 exerts a force against flange 32. This force exerted by pusher 35 imparts momentum to flange 13 in the general direction of the movement of second conveyor 12. Thus, flange 32 slides along foot 34 until foot 34 is below the plane of second conveyor 12.

Because the relative horizontal velocities of flange 32 and second conveyor 12 are lessened through the action of pusher 35, there is less of a moment on flange 32 imparted at the contacting surface of flange 32 and the second conveyor 12. This reduction in the moment acting on flange 32 leads to a more reliable turn, with fewer flanges falling over backward as they contact second conveyor 12.

Figure 4:
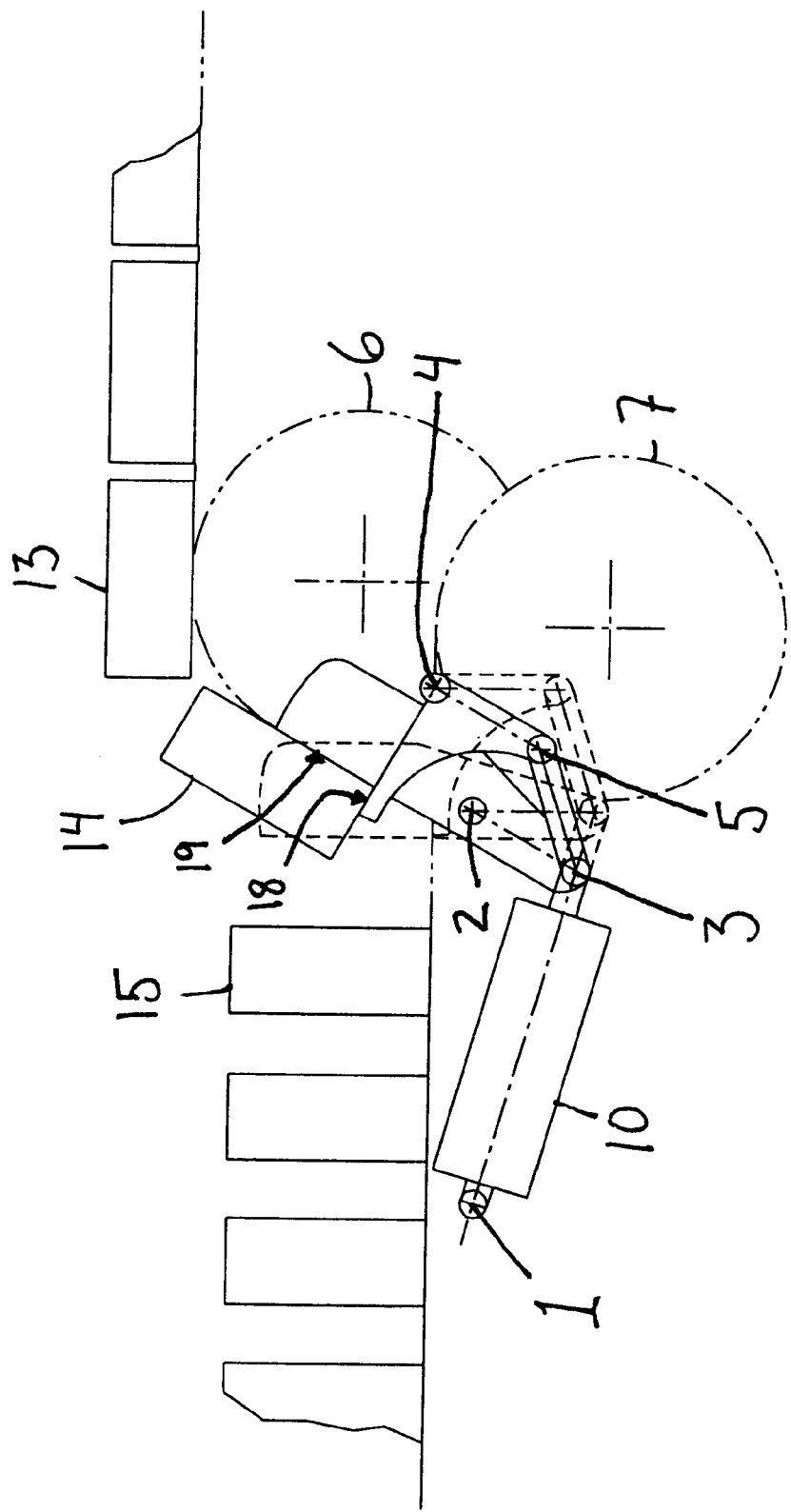
FIG. 4 is a side view of another embodiment of the first turn.

Another embodiment of the first turn section of the invention is shown in FIG. 4. First conveyor 11 and second conveyor 12 are positioned as in the previous embodiments. Additionally, foot 8 and pusher 9, which partially comprise the dampening mechanism of this embodiment, are shown in their starting position, rotatably fixed to foot pivot point 4 and pusher pivot point 2, respectively. A typical flange is depicted at various stages of the turning process. Flange 13 on first conveyer 11 prior to being turned, flange 14 at the moment of contact with foot 8, and flange 15 on second conveyer 12 after being turned demonstrate the positional changes a flange undergoes during the turning process.

In the embodiment shown in FIG. 4, foot 8 and pusher 9 rotatably communicate through link 16 attached to foot 8 at foot linkage point 5 and pusher 9 at pusher linkage point 3. Link 16, foot 8, and pusher 9 together form a four-bar linkage constrained to one degree of freedom. The moved position, shown as a dotted line, indicates the position of foot 8, pusher 9, and link 16 at the end of the stroke. In this embodiment, foot 8 is biased to move clockwise. Any suitable biasing means may be used, as detailed above.

The turning process begins as flange 13 reaches the end of first conveyor 11. Flange 13 follows the curvature of first conveyor pulley 6 and begins to rotate as it falls from first conveyor 11. The side of flange 14 that is to be placed on second conveyor 12 contacts the upper face 18 of foot 8 at or near the time that the side of flange 14 that was in contact with first conveyor 11 contacts the front face 19 of pusher 9. The weight and momentum of flange 14 imparts counter-clockwise rotation to foot 8. As foot 8 rotates and flange 14 moves downwardly, pusher 9 also rotates counterclockwise, maintaining support of flange 14.

As is evident from the moved position shown as a dotted line in FIG. 4, when foot 8 pusher 9 members rotate, the flange-supporting surfaces of each slide relative to one another. This sliding acts to push flange 14 along foot 8 in the direction of second conveyor's 12 motion during the downstroke. It is best if the four-bar is designed such that, at the end of the stroke, pusher 9 has completely pushed flange 14 off of foot 8.

Figure 5:
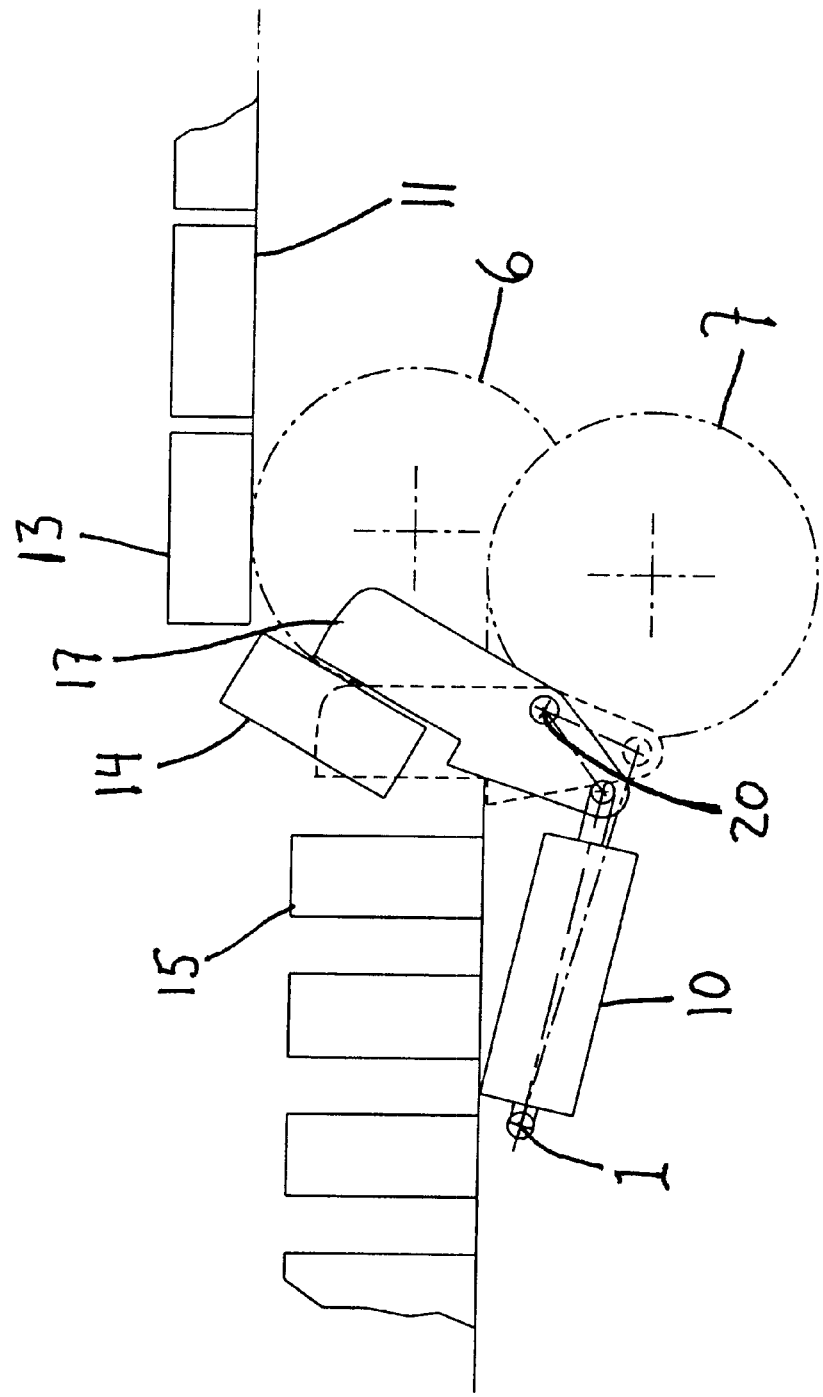
FIG. 5 is a side view of a simplified version of the embodiment in FIG. 4.

A simplified version of this embodiment is shown in FIG. 5. Foot 8 and pusher 9 of the previous embodiment are combined to make one foot member 17. The member rotates about single pivot point 20 and is dampened by damper 10 as before. Because there is no four-bar linkage, this embodiment does not push flange 14 off of foot 17 during rotation. Because foot 17 is biased to rotate clockwise, this will lead to foot 17 pushing up against flange 14 while flange 14 is carried away on second conveyor 12. The bias must be set to a level that will not cause flange 14 to flip over forward as it passes off of foot 17.

The speed of the two conveyors is important to achieving good results. First conveyor 11 should travel at 20 to 80 feet per minute, depending on the size of the flanges being processed. Second conveyor 12 should generally be set at a speed near to that of first conveyor 11. A speed offset may be desirable when non-square flanges are used. If a rectangular flange is being turned from its wide side onto its narrow side, second conveyor 12 should be set to a lower speed than first conveyor 11 to achieve the same spacing between flanges on second conveyor 12 as that on first conveyor 11.

The vertical spacing between the conveyors is also important, and it must be varied depending on the size of the flanges being turned. For example, for a flange the size of a two-by-four, or 1.5 inches by 3.5 inches, second conveyor 12 should be 3.75 to 4.75 inches below first conveyor 11. One quarter to one and one quarters of an inch more than the height of the flange is generally a good spacing, although for larger flanges it may be found that more spacing is desirable.

Figure 6:
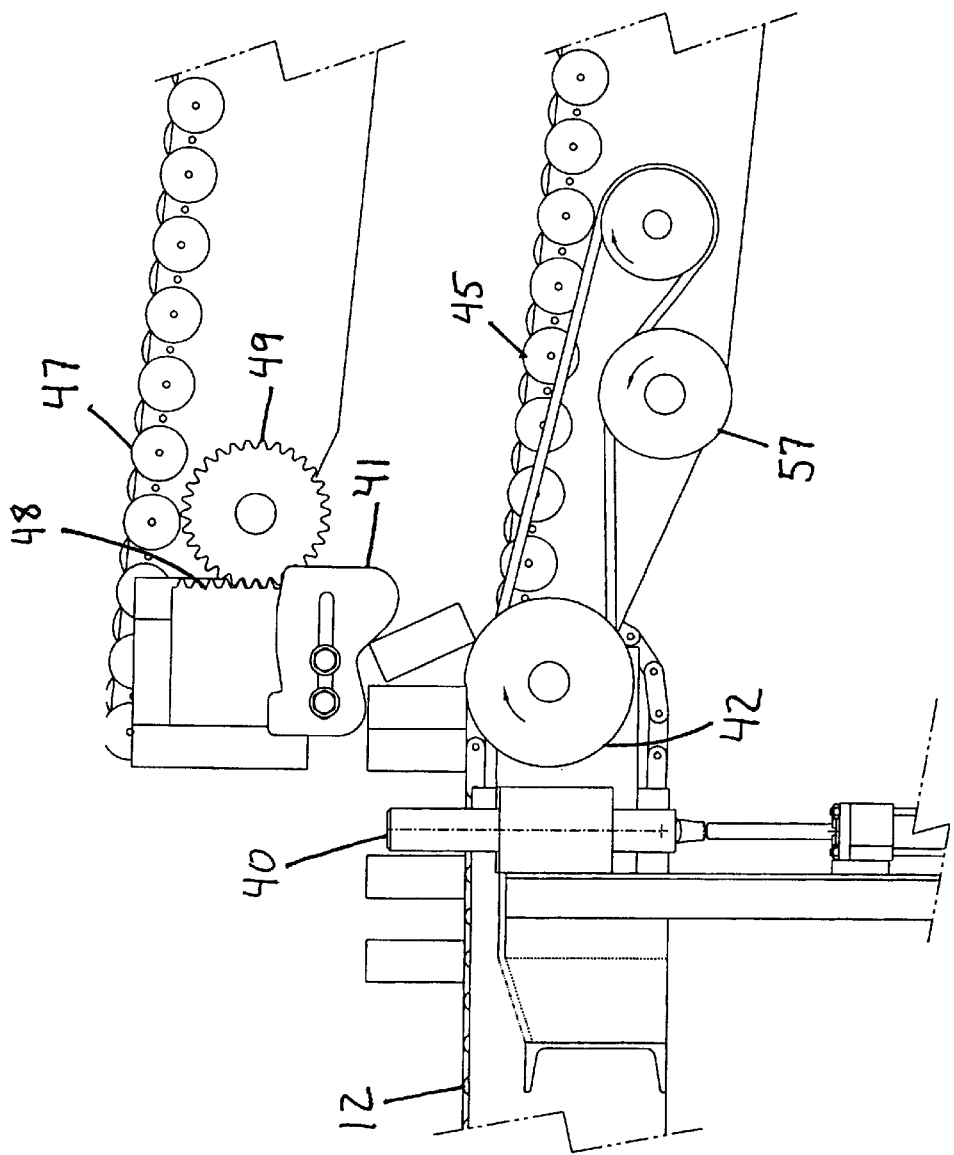
FIG. 6 is a side view of the second turn, upper section.

FIG. 6 shows the upper section of the second turn. Second conveyor 12, shown at the left, carries the flanges into stop pins 40. Upon the removal of stop pins 40, the flanges proceed along second conveyor 12 until they begin to pass under dog 41. At this point, second conveyor 12 begins to follow the rounded surface of second conveyor end pulley 51. In this figure, second conveyor end pulley 51 is shown as a sprocket, used with the chain embodiment of second conveyor 12.

Rather than follow the rounded edge of second conveyor end pulley 51, the flanges contact upper wheel 42 and are propelled forward. Upper wheel 42 is driven by a belt or chain powered by upper wheel drive 57. Soon after contacting upper wheel 42, the upper leading edge of each flange is halted by dog 41. The height of dog 41 above upper wheel 42 can be adjusted for flanges of different sizes using any appropriate means. In FIG. 6, the adjustment is made using rack 48 and gear 49. Dog 41 is attached to rack 48 which in turn is fixed to reject conveyor 47. The shape of dog 41 can also be changed to accommodate different types of flanges simply by rotating it 180 degrees about an axis perpendicular to the page. Once a flange makes contact with dog 41, it begins to rotate counter-clockwise. Upper wheel 42 forces the flange back into its original orientation and moves the flange onto upper discharge conveyor 45.

Figure 7:
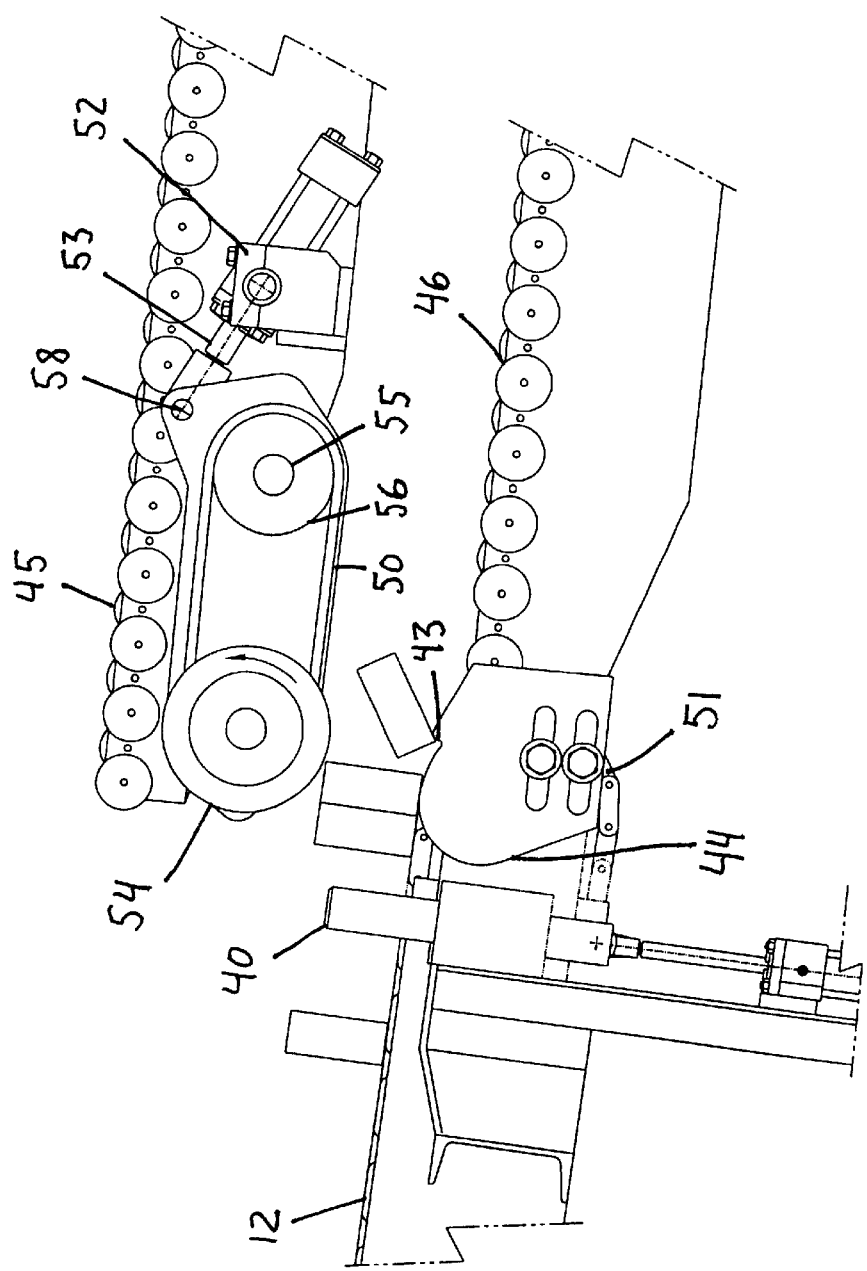
FIG. 7 is a side view of the second turn, lower section.

FIG. 7 shows the very similar mechanism of the second turn, lower section. As before, the flanges proceed along second conveyor 12 until they are arrested by stop pins 40. When stop pins 40 are removed, the flanges proceed to the end of second conveyor 12. There, the curvature of cam 44 provides a smooth transition off of second conveyor 12. The flanges' momentum carries them forward until the top edge of each flange contacts lower wheel 54. As the top of each flange is propelled forward by lower wheel 54, the bottom edge is caught on trip point 43. Lower wheel 54 causes the flange to rotate clockwise, 180 degrees from its original orientation. Thus properly oriented, the flange moves away on lower discharge conveyor 46.

Upper wheel 42 and lower wheel 54 are best made of urethane with a hardness of between durometer 20 and 90. The preferable hardness is between durometer 50 and 60. The wheels should rotate between 30 and 120 RPM with the best results being achieved near 60 RPM.

The second turn, lower section mechanism can be modified to accommodate many sizes of flanges just as the upper section. Lower wheel 54 is fixed to lower wheel mount 50 which is in turn rotationally affixed at wheel mount bearing 55. Lower wheel 54 is powered by a belt or chain turned by lower drive wheel 56. Lower wheel mount 50 is rotationally positioned by the action of hydraulic cylinder 53, which itself is rotationally fixed to pillow block 52.

It is desirable to mount hydraulic cylinder 53 such that it can rotate because the contact between hydraulic cylinder 53 and lower wheel mount 50 describes an arc during adjustment of lower wheel 54, while hydraulic cylinder 53 is only capable of axial movement. Thus, lower wheel mount 50 rotates as hydraulic cylinder 53 extends and retracts. Hydraulic cylinder 53 is fixed to pin 58 to allow for relative rotation between hydraulic cylinder 53 and lower wheel mount 50 about an axis perpendicular to the page. As hydraulic cylinder 53 extends and retracts, it will itself rotate a small amount about pillow block 52.

The height of lower wheel 54 above cam 44 is determined by the geometry of the mechanism and the extension of hydraulic cylinder 53. Because the geometry is fixed, the system has only one degree of freedom. The particular geometry used in FIG. 7, particularly the length of lower wheel mount 50, makes lower wheel 54 very sensitive to adjustments in the extension of hydraulic cylinder 53. To allow for minute variations in positioning of lower wheel 54, a linear transducer and monitor (not shown) can be used in conjunction with hydraulic cylinder 53.

There are of course other alternate embodiments which are obvious from the foregoing descriptions of the invention, which are intended to be included within the scope of the invention, as defined by the following claims.

We claim:

1. A device for turning flanges comprising:

A first conveyor having an end;

A second conveyor disposed below said end of said first conveyor; and dampening means positioned to engage a flange descending from said end of said first conveyor prior to said flange impacting said second conveyor such that the energy attained by said flange during its fall is reduced.

2. The device of claim 1 further comprising:

a wheel having an axis and a perimeter, positioned vertically such that said axis is below the top surface of said second conveyor and said perimeter rises above said top surface of said second conveyor, forced to spin such that when said second conveyor carries said flanges into said wheel, said flanges are accelerated in the direction of conveyance; and a dog positioned to halt the top edge of said flanges as said flanges are accelerated by said wheel.

3. The device of claim 1 further comprising:

a wheel having an axis and a perimeter, positioned vertically and above said second conveyor such that said perimeter extends below the top edge of said flanges, forced to spin such that when said second conveyor carries said flanges into said wheel, said flanges are accelerated in the direction of conveyance; and a trip point positioned to halt the bottom edge of said flanges as said flanges are accelerated by said wheel.

4. The device of claim 3 further comprising a cam adapted to provide a smooth track for said flanges leading into said trip point.

5. The device of claim 3 wherein the position of said wheel is adjustable.

6. The device of claim 2 wherein the position of said dog is adjustable.

7. The device of claim 2 further comprising stop pins adapted to stop said flanges on said second conveyor prior to said flanges contacting said wheel, said stop pins being removable.

8. A device for turning flanges comprising:

a first conveyor having an end;

a second conveyor disposed below said end of said first conveyor;

a foot having an upper face and a starting position, said foot being pivotally connected to a foot pivot point, said foot positioned to receive said flanges onto said upper face from said end of said first conveyor while said foot is in said starting position and deposit said flanges onto said second conveyor;

a pusher having a front face, said pusher being pivotally connected to a pusher pivot point, said pusher rotatably communicating with said foot, said pusher being positioned to receive said flanges from said end of said first conveyor onto said front face and support said flange until said flange is deposited onto said second conveyor; and a damper rotatably communicating with said foot member.

9. The device of claim 8 wherein said foot pivot point and said pusher pivot point are the same.

10. The device of claim 9 wherein said foot and said pusher comprise one member.

11. The device of claim 8 further comprising biasing means adapted to return said foot member to said starting position after said flange has been deposited on said second conveyor.

12. The device of claim 11 wherein the damper is comprised of a piston and a cylinder that move fluid through a restriction.

13. The device of claim 12 wherein said biasing means is integrated into said piston and cylinder.

14. The device of claim 8 wherein said first conveyor and said second conveyor are comprised of chains and pulleys.

15. A device for turning flanges of approximately rectangular cross-section having a first side and second side comprising:

a first conveyor for contacting said first side of said flanges, said first conveyor having an end;

a second conveyor disposed below said end of said first conveyor;

a foot having an upper face and a starting position, said foot being pivotally connected to a foot pivot point, said foot positioned to receive onto said upper face said second side of said flanges from said end of said first conveyor while in said starting position and support said second side of said flanges until said second side of said flange is in contact with said second conveyor;

a pusher having a front face, said pusher being pivotally connected to a pusher pivot point, said pusher rotatably communicating with said foot, positioned to receive onto said front face said first side of said flanges from said end of said first conveyor and support said flange during turning; and a damper rotatably communicating with said foot member.

16. A device for turning flanges comprising:

a first conveyor having an end;

a second conveyer disposed below said end of said first conveyor;

a foot having a top face and a starting position, translatable along an approximately vertical axis, positioned to receive said flanges from said end of said first conveyor onto said top face and deposit said flange onto said second conveyor; and a damper communicating with said foot.

17. The device of claim 16 further comprising a pusher having a side face, translatable along an axis, fluidly communicating with said damper, wherein said pusher exerts force derived from the energy of said flange against said flange in the approximate direction of conveyance.

18. The device of claim 16 further comprising biasing means adapted to return said foot to said starting position after said flange has been deposited on said second conveyor.

19. A device for turning flanges comprising:

A first conveyor having an end;

A second conveyor disposed below said end of said first conveyor;

dampening means positioned to engage a flange descending from said end of said first conveyor prior to said flange impacting said second conveyor such that the energy attained by said flange during its fall is reduced; and said flange experiencing no relative motion with said second conveyor upon said flange impacting said second conveyor.

* * * * *